United States Patent

Tomizawa et al.

[11] Patent Number: 5,852,438
[45] Date of Patent: Dec. 22, 1998

[54] VIDEO EDITOR

[75] Inventors: Mizuo Tomizawa; Atsushi Tomita; Hironori Mikami; Satoshi Seto, all of Osaka, Japan

[73] Assignee: Roland Kabushiki Kaisha, Osaka, Japan

[21] Appl. No.: 563,925

[22] Filed: Nov. 29, 1995

[30] Foreign Application Priority Data

Sep. 21, 1995 [JP] Japan .................................. 7-267703

[51] Int. Cl.⁶ .................................................. G06F 13/00
[52] U.S. Cl. ............................ 345/328; 348/595; 348/722
[58] Field of Search .................................. 348/595, 584, 348/722, 569; 381/119; 345/328

[56] References Cited

U.S. PATENT DOCUMENTS

| | | | |
|---|---|---|---|
| 4,626,892 | 12/1986 | Nortrup et al. | 348/569 |
| 4,750,050 | 6/1988 | Belmares-Sarabia et al. | 348/584 |
| 5,144,454 | 9/1992 | Cury | 348/722 |
| 5,220,433 | 6/1993 | Mogamiya et al. | 348/722 |
| 5,355,450 | 10/1994 | Garmon et al. | 348/722 |

Primary Examiner—Richard A. Hjerpe
Assistant Examiner—Ricardo Osorio
Attorney, Agent, or Firm—Lyon & Lyon LLP

[57] ABSTRACT

For the sake of improving the operability in edits of audio and video signals in a video editor, the video editor of the present invention is constituted in such that at least two types each of audio and video signals are inputted, and levels of the audio and the video signals inputted are controlled in response to the operations of faders. The video editor is provided with a first fader; a second fader; and a control means for controlling simultaneously a ratio of composition in two types of video signals inputted with levels of two types of audio signals inputted in response to the operation of the aforesaid first fader, and only the levels of the audio signals inputted being controlled in response to the aforesaid second fader.

5 Claims, 8 Drawing Sheets

VIDEO EDITOR

BACKGROUND OF THE INVENTION

1. Field of the Invention

The present invention relates to a video editor, and more particularly to a video editor used suitably for performing video edits by employing a personal computer and the like.

2. Description of the Related Art

As is observed in use of CD-ROMs, and in development of multimedia etc., a personal computer could have controlled freely audio and video signals recently. With such development in personal computers, a video editor in which audio and video signals can be freely controlled by the use of a personal computer has been proposed in recent years, and is called desk top video (DTV).

OBJECT AND SUMMARY OF THE INVENTION

It is an object of the present invention to provide a video editor in which operability in edits of audio and video signals are further elevated in the above described video editor.

In order to attain the above described object, the video editor according to the present invention is constituted in such that at least two each audio and video signals are inputted, and levels of the audio and the video signals inputted are controlled in response to the operations of faders. The video editor of the present invention is provided with a first fader, a second fader, and a control means for controlling simultaneously a ratio of composition in two video signals inputted with levels of two audio signals inputted in response to the operation of the aforesaid first fader, and only the levels of the audio signals inputted are controlled in response to the aforesaid second fader.

Furthermore, according to another aspect of the present invention, the video editor is provided with an inputting means for inputting two video signals, a first fader for instructing a ratio of composition in the aforesaid two video signals which were inputted by the aforesaid inputting means in response to a set position, a first control means for automatically shifting the set position by the aforesaid first fader with the lapse of time, besides varying the ratio of composition in the aforesaid two video signals, and a first setting means for setting arbitrarily a shift-starting position and/or a shift-finishing position in case of automatically shifting the aforesaid first fader.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An example of the manner for embodying the video editor according to the present invention will be described in detail hereinbelow by referring to the accompanying drawings.

1. Constitution of System of DTV

Figure 1:
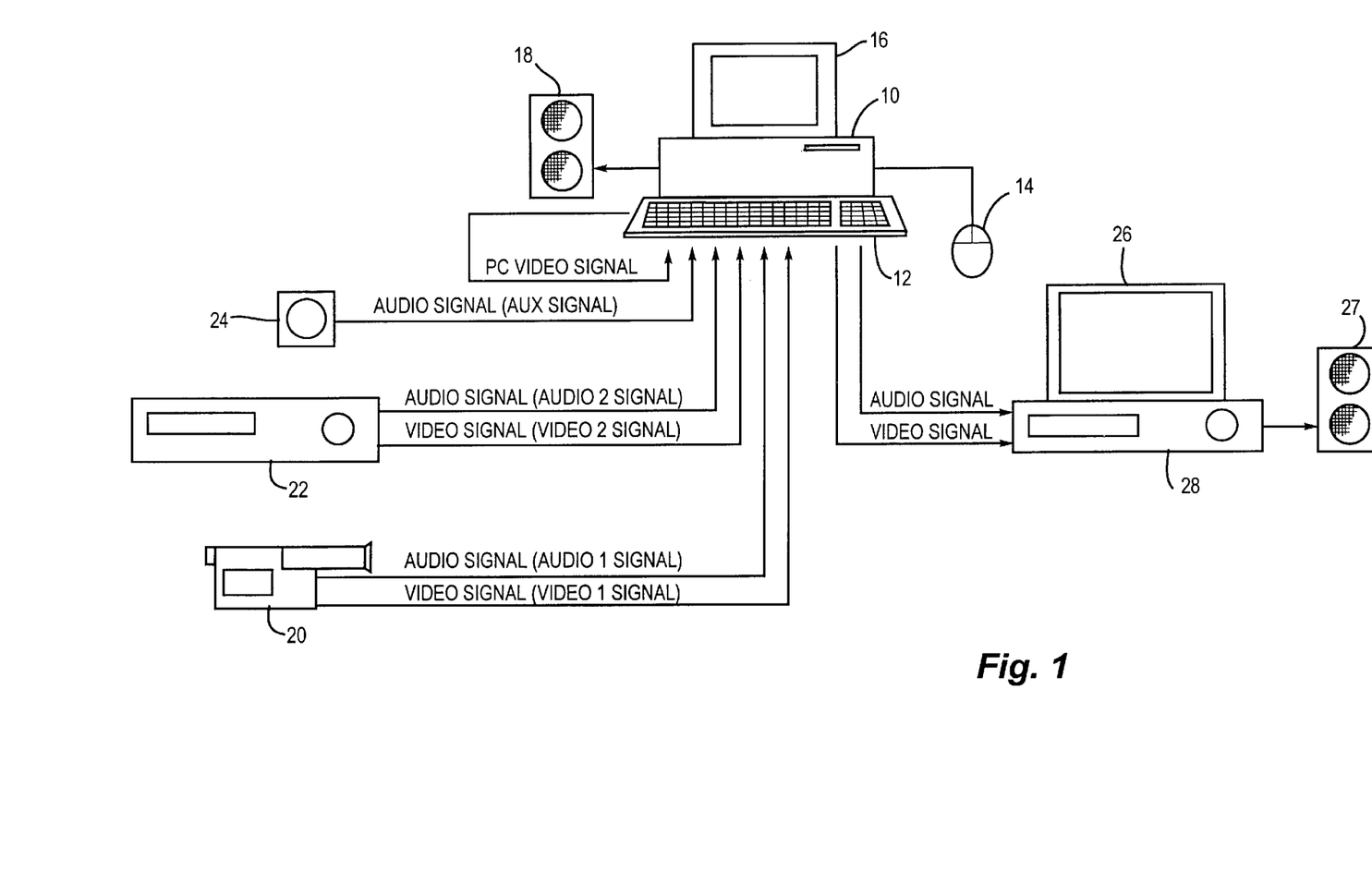
FIG. 1 is a conceptual diagram showing an example of the systematic constitution of a DTV employing the video editor according to the present invention.

FIG. 1 is a conceptual diagram showing an example of the systematic constitution of a DTV employing the video editor according to the present invention.

As shown in FIG. 1, in the systematic constitution of the DTV using the video editor according to the present invention, it is arranged in such that to a personal computer 10 into which has been incorporated the video editor of the present invention, two lines of the video signals as image signals outputted from a video camera 20 or video cassette recorder (VCR) 22 etc. as well as 1 line of the PC video signal produced in the personal computer 10 and the like can be inputted, besides three lines of the audio signals as aural signals outputted from the video camera 20, the VCR 22 or a compact disc player (CD player) 24 etc. can be inputted. Furthermore, it is arranged in such that with respect to the video signals, the PC video signals, and the audio signals inputted to the personal computer 10, processing of edits such as composition of these signals, or addition of effects thereto, besides insertion of a title thereinto is performed by using a keyboard 12 being a character inputting device or a mouse 14 being a pointing device each of which is connected to the personal computer 10, and then the video signals and the audio signals are outputted to a TV monitor 26 and a VCR 28 connected to a speaker 27 as the output signals after the same were subjected to the edit processing, whereby the audio and the video signals thus edited are recorded on a videotape by means of the VCR 28 to be capable of video editing, besides to be capable of watching and listening by means of the TV monitor 26 and the speaker 27.

The video signals or the PC video signals inputted are edited while watching a display device 16, and the audio signals inputted are edited while listening sounds from the speaker 18.

In the constitution of the system shown in FIG. 1, the video signal and the audio signal outputted from the video camera 20 are made to be a pair to be used as the first input line of video signal and the first input line of audio signal, respectively, while the video signals and the audio signals outputted from the VCR 22 are made to be a pair to be used as the second input line of video signal and the second input signal of audio signal, respectively.

However, it is not constituted to make the audio signal and the video signal into a pair as in the systematic constitution shown in FIG. 1, but these audio and video signals may, of course, be arranged to be inputted through completely independent input lines, respectively.

In the following description, video signals, PC video signals, and audio signals are inputted through the input lines shown in the systematic constitution of FIG. 1, respectively, and the video signal and the audio signal through the first input line are called "video 1 signal" and "audio 1 signal", respectively, the video signal and the audio signal through the second input line are called "video 2 signal" and "audio 2 signal", respectively, and the audio signal through a third input line is called "AUX signal".

2. Input and Output

Figure 2:
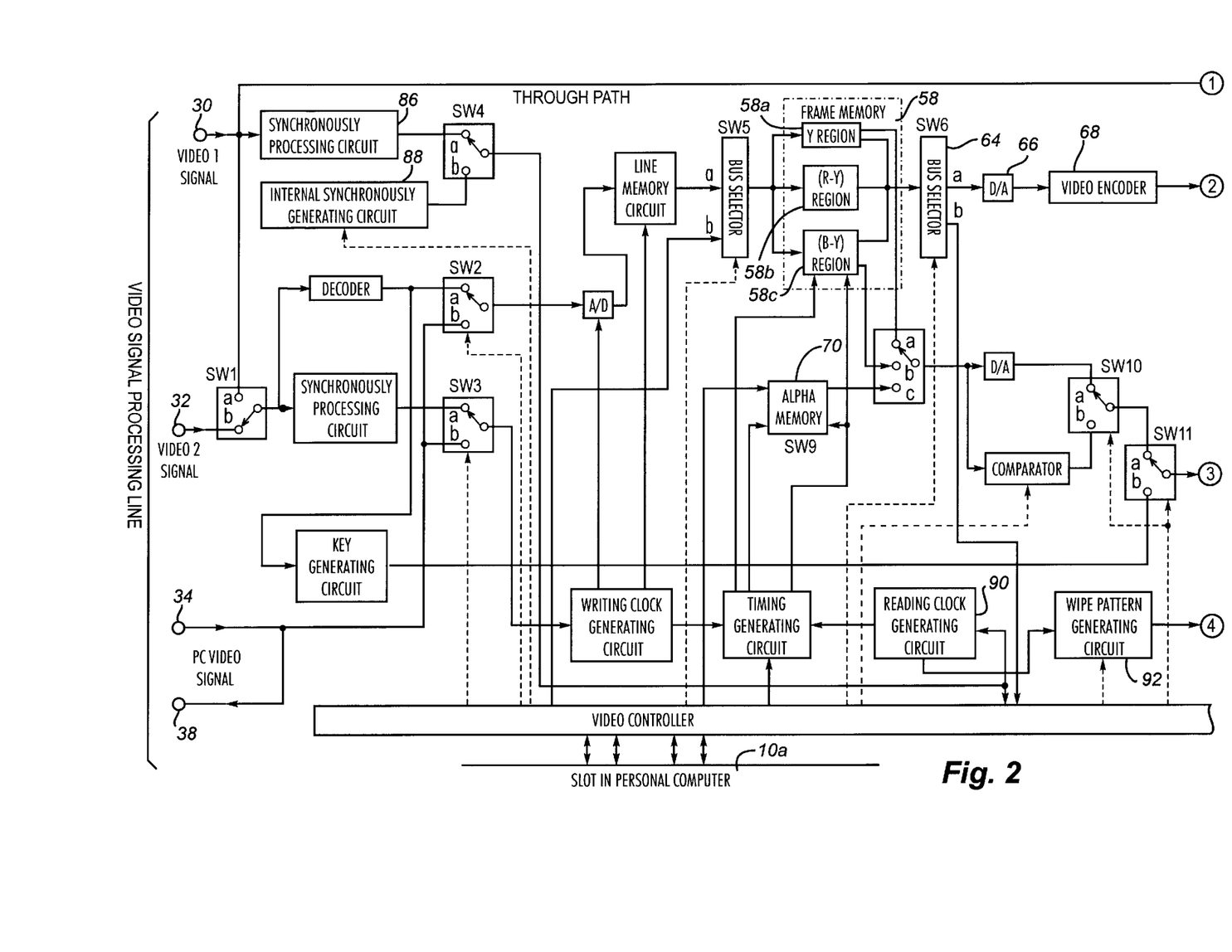
FIG. 2 is a block constitutional diagram showing a hardware structure of the video editor according to a manner for embodying the present invention on board of a personal computer.
Figure 3:
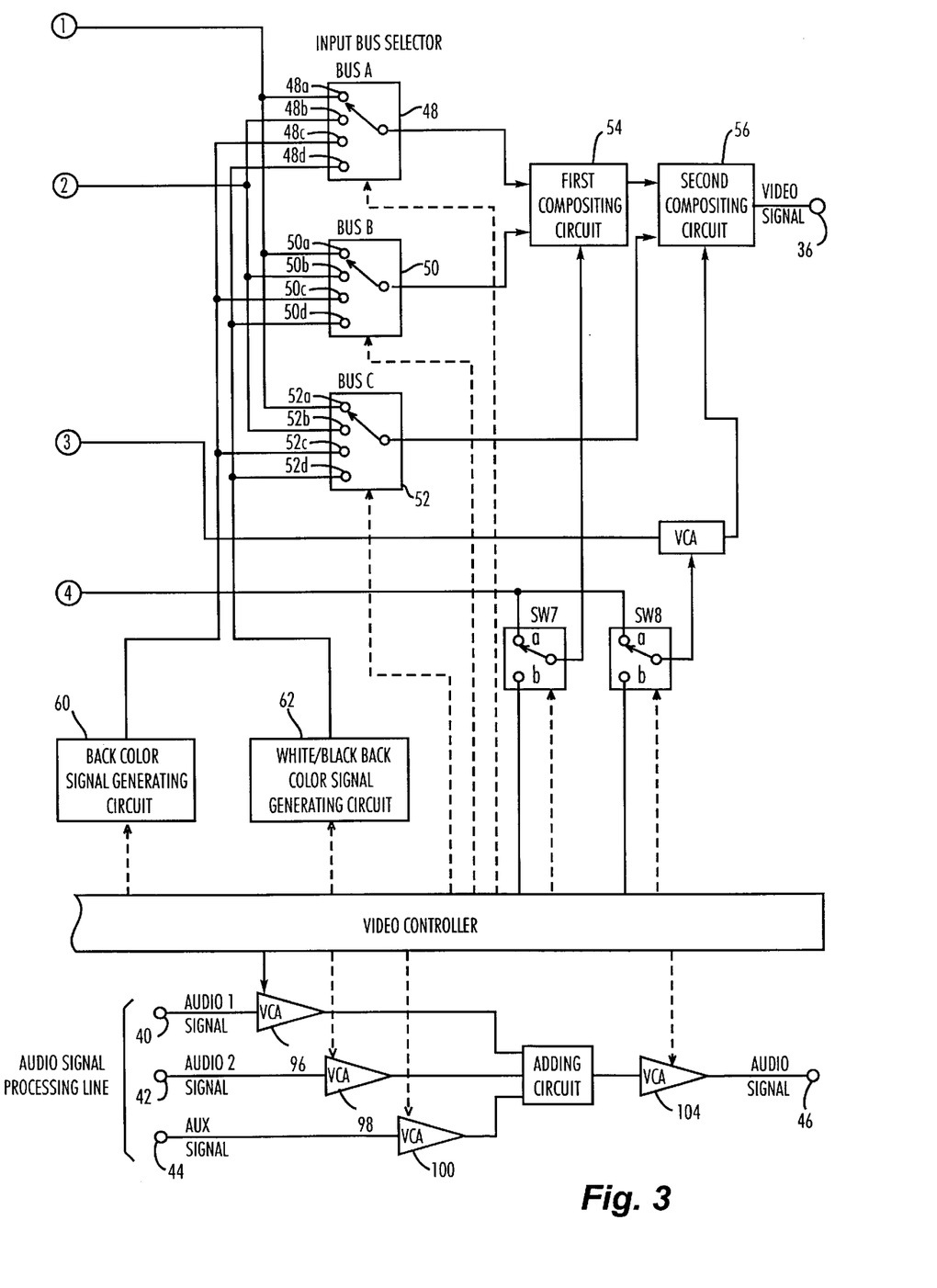
FIG. 3 is a block constitutional diagram showing a hardware structure of the video editor according to a manner for embodying the present invention on board of a personal computer.

FIGS. 2 and 3 are block constitutional diagrams each showing the circuit construction of an expansion board to be fitted into an expansion slot 10a of the personal computer 10 (hereinafter referred to as "video board"). Since now-available personal computers have not a facility for processing video signals or audio signals, the circuit as described above is added to a personal computer to thereby process these signals.

Such a video board is provided with input terminals for the above described video signals, the PC video signals, and the audio signals, respectively, and output terminals for outputting the signals after being edited, respectively, as described hereinbelow.

More specifically, a video board is provided with a video 1 signal input terminal 30 and a video 2 signal input terminal 32 as the input terminals for video signals, respectively, as well as with an PC video signal input terminal 34 as the input terminal for PC video signals.

Furthermore, the video board is provided with a video signal output terminal 36 as the output terminal for the video signals processed by the video editor according to the present invention, and an PC video signal output terminal 38 as the output terminal for PC video signals, respectively.

Moreover, the video board is also provided with an audio 1 signal input terminal 40, an audio 2 signal input terminal 42, and an AUX signal input terminal 44 as the input terminals for audio signals, respectively.

In addition to the above, the video board is provided with an audio signal output terminal 46 as the output terminal for the audio signals processed by the video editor according to the present invention.

Figure 4:
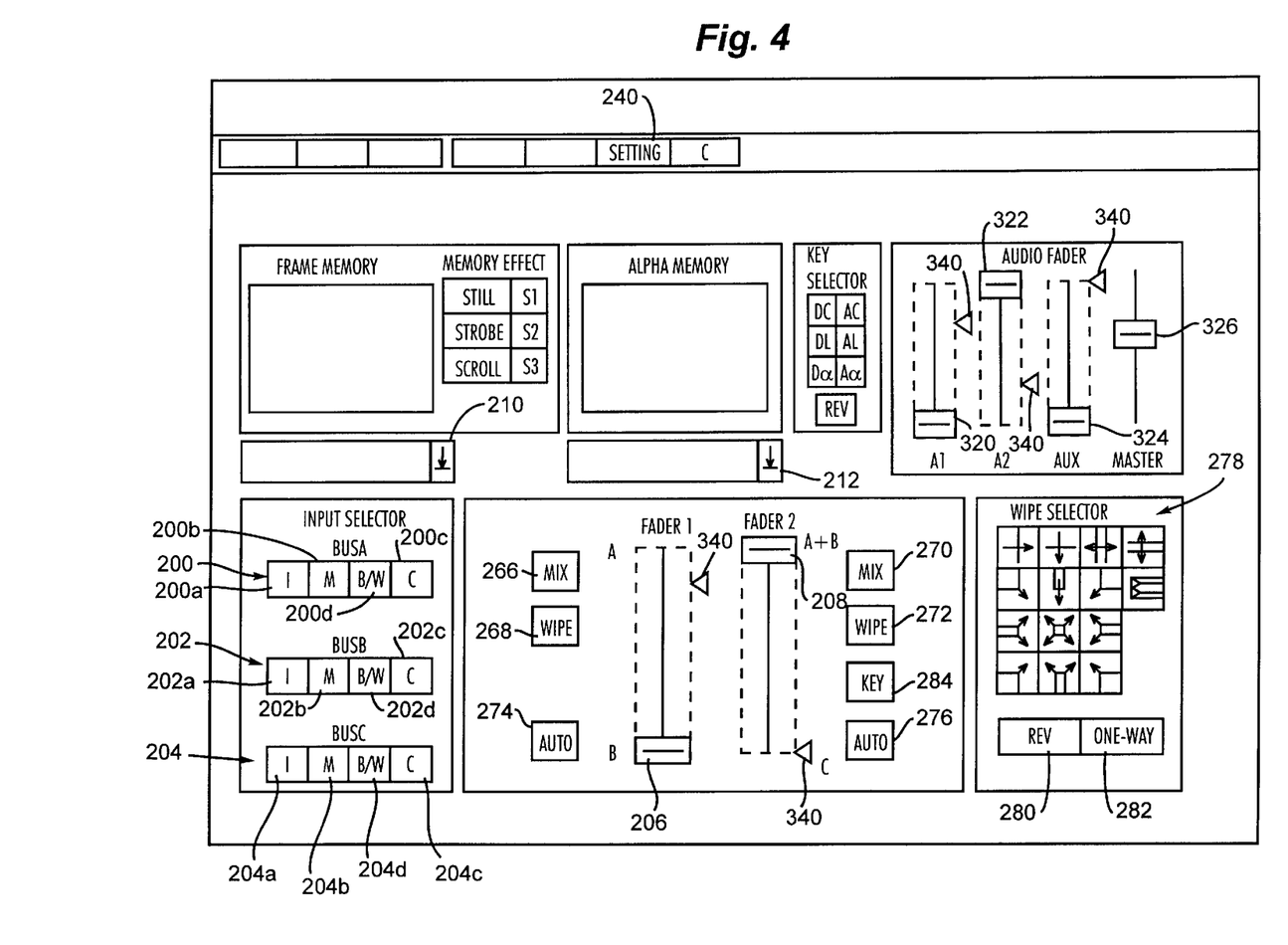
FIG. 4 is an explanatory view showing a console displayed on a display device 16.

Meanwhile, FIG. 4 shows a screen display on the display device 16 in the case where the video editor shown in FIGS. 2 and 3 is started up by means of the personal computer 10 (hereinafter, the screen display on the display device 16 shown in FIG. 4 is referred to as "console"). In the following description, the console shown in FIG. 4 will be also referred to.

It is to be noted that in the present mode for embodying the invention, it is constituted in such that a user can perform an input operation to the video editor by clicking a prescribed position on the console by means of the mouse 14, by inputting a numerical value to a prescribed position on the console by the use of the keyboard 12, or by effecting the like operations.

3. Explanation for Processing of Image 3-1. Explanation for Video Signal

In the video editor, the addition and the composition of effects can be performed for video signals of three lines of a bus A (BUS A), a bus B (BUS B), and a bus C (BUS C), respectively, to thereby edit the image wherein it is possible to select the video signal for the bus A by an input selector for the bus A 200 (corresponding to an input bus selector for the bus A 48 in FIG. 3) of the console, the video signal for the bus B by an input selector for the bus B 202 (corresponding to an input bus selector for the bus B 50 of FIG. 3), and the video signal for the bus C by an input selector for the bus C 204 (corresponding to an input bus selector for the bus C 52 in FIG. 3), respectively.

In the circumstances, the video signal selected as the bus A is composited with the video signal selected as the bus B in a ratio specified by the position of a knob 206 of the fader 1 in a first compositing circuit 54, and the signal thus composited is outputted to a second compositing circuit 56. In the second compositing circuit 56, the composited signal outputted from the first compositing circuit 54 is composited with the video signal selected as the bus C in a ratio specified by the position of a knob 208 of the fader 2, and the signal thus composited is outputted from the video signal output terminal 36 as the video signal to be outputted to the outside.

Furthermore, the video signal outputted from the video signal output terminal 36 is inputted to the VCR 28 and the TV monitor 26.

3-2. Bus Selector

The video signals to be supplied to the above described respective bus selectors 48, 50, and 52 correspond to those shown in the following Items (1) through (4).

(1) Video 1 signal=The signal which is inputted to the video 1 signal input terminal 30 without passing through a frame memory 58.

(2) Frame memory signal=The video signals obtained by reading the frame memory 58.

(3) Back color signal (video signal with monochrome background)=The signals produced by a back color signal generating circuit 60.

(4) White back signal (video signal with white background) or black back signal (video signal with black background)=The signals produced by a white/black back color signal generating circuit 62.

In these situations, when each of buttons on the console corresponding to the signals of the above described Items (1) through (4), respectively, is clicked, a desired signal can be selected as the signal for each of the input buses.

The term "frame memory 58" used herein means a memory being capable of writing video signals for one frame (picture image), besides capable of reading the written video signals at the different timing from that of the writing the signals. In other words, the frame memory 58 can independently write and read video signals.

The frame memory 58 is composed of a Y region 58a for storing a luminance signal Y indicating the luminance component constituting video signals, an (R-Y) region 58b for storing a color difference signal (R-Y) obtained by subtracting the luminance signal Y component from an R (red) elementary color signal, and a (B-Y) region 58c for storing a color difference signal (B-Y) obtained by subtracting the luminance signal Y component from a B (blue) elementary color signal, and which is in a so-called three-plane composition.

In the following, a more detailed explanation will be made with respect to selecting operations for images based on the above described respective video signals as well as with respect to processing for the video signals in case of performing the aforesaid selecting operations.

3-2-1. Selection of Video 1 Signal

Figure 5:
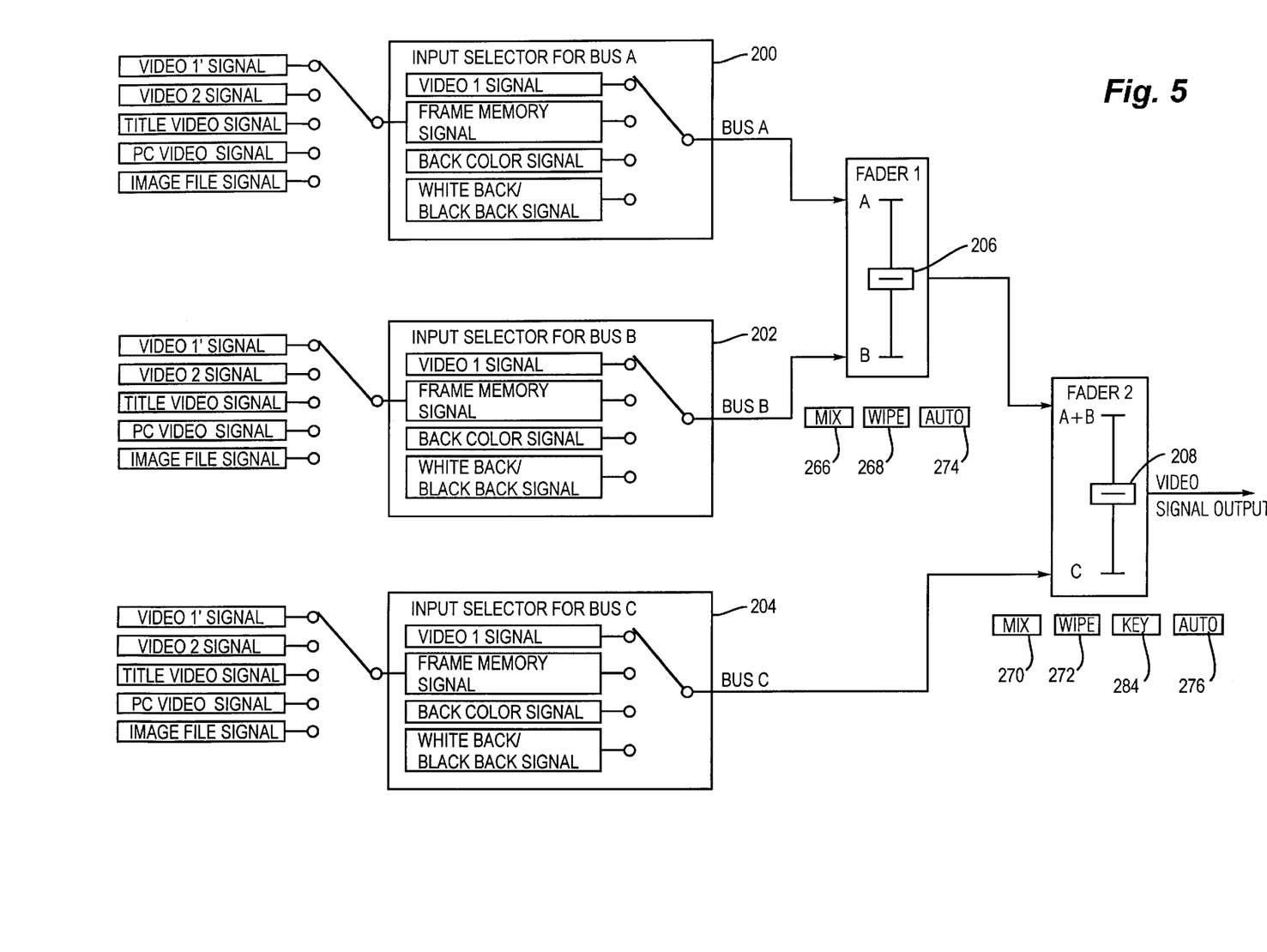
FIG. 5 is a conceptual diagram for explaining a composition of video signals.

The following explanation will be made by referring to FIG. 5 in addition to FIGS. 1 through 4. When a video 1 button 200a of the input selector for bus A 200 is clicked, the input bus selector for bus A 48 is switched to the side of a video 1 signal terminal 48a.

To the video 1 signal terminal 48a is directly inputted the video 1 signal which was inputted to the video 1 signal input terminal 30 by way of a through path, but not the frame memory 58.

Furthermore, also with respect to the bus B and the bus C, when each of video 1 buttons (202*a* and 204*a*) is similarly clicked to switch each of the input bus selectors (50 and 52) corresponding to the respective buses to each side of the video 1 signal terminals (50*a* and 52*a*), a video 1 signal is selected.

3-2-2. Selection of Frame Memory Signal 3-2-2-1. Type of Frame Memory Signal

The following explanation will be made by referring also to FIG. 5 in addition to FIGS. 1 through 4. When a frame memory button 200*b* of the input selector for bus A 200 is clicked, the input bus selector for bus A 48 is switched to the side of a frame memory signal terminal 48*b*.

When the data which has been written into the frame memory 58 is read, frame memory signals are inputted to the frame memory signal terminal 48*b* through the path of the frame memory 58→ the bus selector 64 (an internal switch SW6)→ a digital-to-analog converter 66→ a video-encoder 68→ the frame memory signal terminal 48*b*.

Then, the following video signals enumerated in Items (1) through (5) can be selected as frame memory signals.

(1) Video 1' signal=The video 1 signal through the frame memory 58.

(2) Video 2 signal=The video 2 signal through the frame memory 58.

(3) Title video signal=The image signal in a title obtained by reading a title file (the title file consists of title data (the data indicating the character faces in a title) which is written into the frame memory 58 and also is read from the frame memory 58 as frame data and transmittance data (the data indicating the transmittance in the character faces in a title) which is written into an alpha memory 70 and also is read from the alpha memory 70 as alpha data). Namely, the title file is prepared by including the title data and the transmittance data, and which is stored in an external storage device such as a memory, a floppy disk and the like of the personal computer 10.

(4) PC video signal=The PC video signal passing through the frame memory 58. In the present mode for embodying the invention, this PC video signal becomes a video signal which is supplied to the display device 16 of the personal computer 10 and displayed thereon.

(5) Image file signal=The signals for a still-frame image obtained by reading an image file comprising the image data for one frame prepared in accordance with capture processing as frame data, the image data for one frame prepared by a publicly known image producing device etc., and the like image data. The image file is stored in an external storage device such as a memory, a floppy disk and the like of the personal computer 10.

Furthermore, also with respect to the bus B and the bus C, when each of frame memory buttons (202*b* and 204*b*) is similarly clicked to switch each of the input bus selectors (50 and 52) corresponding to the respective buses to each side of the frame memory signal terminals (50*b* and 52*b*), a frame memory signal is selected.

3-2-2-2. Writing Files into and Reading the Same from Frame Memory and Alpha Memory There are a title file, an image file, and an alpha file as the files which are stored in an external storage device such as a memory, a floppy disk and the like of the personal computer 10 and to be written into the frame memory 58 or the alpha memory 70. It is to be noted that the external storage device such as a memory, a floppy disk and the like, which has stored the title file, the image file, and the alpha file, of the personal computer 10 is hereinafter referred simply to as "file memory".

As described above, the title file is the data for obtaining title video, and the image file is the data for obtaining image file video, but the alpha file is the data indicating luminance and transmittance and which is used in processing or the like in a key signal such as a chromakey and the like.

Data formatting of the title file, the image file, and the alpha file will be described herein. The title file is composed of the frame data and the alpha data, the image file is composed of only the frame data, and the alpha file is composed of only the alpha data.

In the case when the title file, the image file, and the alpha file as described above are read from the file memory and then, written into the frame memory 58 and the alpha memory 70, respectively, a selection for reading which of the title file, the image file, and the alpha file from the file memory as well as a selection for writing the file which has been selected and read into which of the frame memory 58 and the alpha memory 70 can be carried out.

3-2-3. Selection for Back Color Signal

The back color signal is selected in case of using a monochrome background as the video image, and the explanation therefor will be made by referring also to FIG. 5 in addition to FIGS. 1 through 4. When a back color button 200*c* of the input selector for bus A 200 is clicked, the input bus selector for bus A 48 is switched to the side of a back color video terminal 48*c*.

To the back color signal terminal 48*c* is inputted the back color signal which was produced by a back color signal generating circuit 60.

It is to be noted that the back color signal is selected in case of employing a monochrome background as described above, and a color of the back color can arbitrarily be set in accordance with the following operations.

Figure 6:
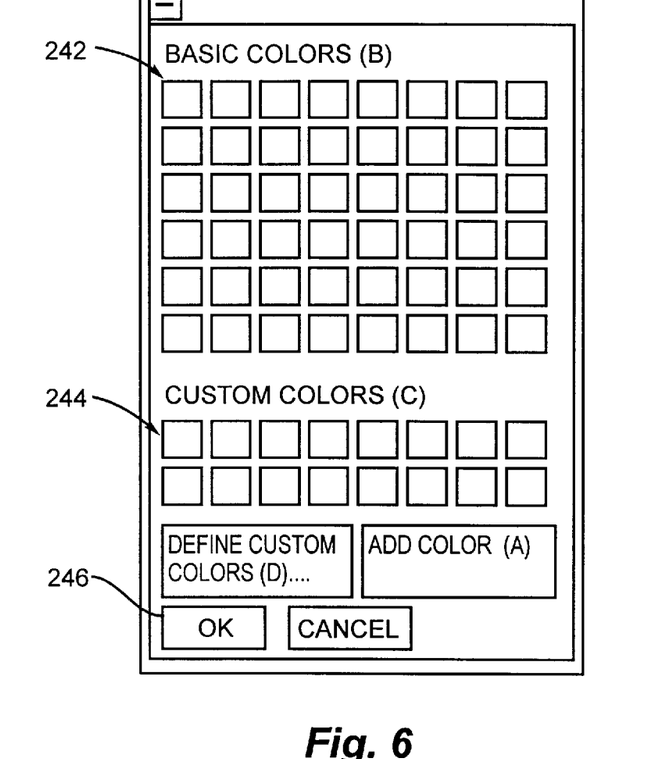
FIG. 6 is an explanatory view showing the "color setting" dialog box displayed on a display device.

Namely, first, a setting button 240 in the menu on the console is clicked to open a setting menu (not shown), and a "back color" command is selected. Then, a "color setting" dialog box is displayed on the display device 16 (see FIG. 6). A desired color is selectively clicked among those in a basic color (B) palette 242 and a produced color (C) palette 244 to set a back color, and then an OK button 246 is clicked to close the dialog box.

Furthermore, also with respect to the bus B and the bus C, when each of back color buttons (202*c* and 204*c*) is similarly clicked to switch each of the input bus selectors corresponding to the respective buses to each side of the back color signal terminals (50*c* and 52*c*), a back color signal is selected.

3-2-4. Selection of White Back Signal or Black Back Signal

The white back signal or the black back signal is selected in either the case where a video image is gradually allowed to appear from a white back (white background) or a black back (black background) (fade-in), or on the contrary, the case where a video image is gradually allowed to disappear from each of these backs (backgrounds) (fade-out), and the explanation therefor will be made by referring also to FIG. 5 in addition to FIGS. 1 through 4. When a white back/a black back button 200*d* of the input selector for bus A 200 is clicked, the input bus selector for bus A 48 is switched to the side of a white back/black back signal terminal 48*d*.

To the white back/black back signal terminal 48*d* is inputted the white back color signal or the black back color signal produced by a white/black back color signal generating circuit 62.

A selection of either a white back is produced or a black back is produced by means of the white/black back color signal generating circuit 62 can arbitrarily be set in accordance with the following operations.

Figure 7:
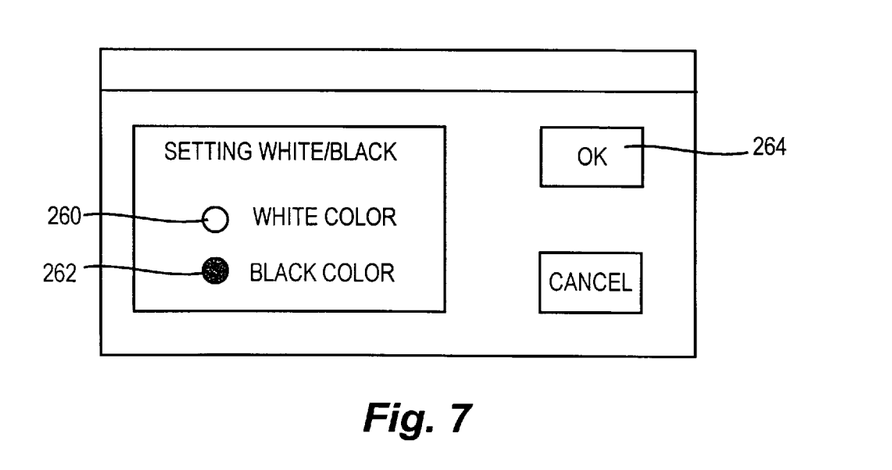
FIG. 7 is an explanatory view showing the "white/black back color setting" dialog box displayed on a display device.

Namely, first, a "setting" button 240 in the menu on the console is clicked to open a setting menu, and a "white/black back" command is selected. Then, a "white/black back color setting" dialog box is displayed on the display device (see FIG. 7). Either a white back or a black back is selected by clicking either a white button 260 or a black button 262, and then an OK button 264 is clicked to close the dialog box.

Furthermore, also with respect to the bus B and the bus C, when each of white back/black back buttons (202d and 204d) is similarly clicked to switch each of the input bus selectors corresponding to the respective buses to each side of the white back/black back signal terminals (50d and 52d), a white back signal or a black back signal is selected.

3-3. Explanation for Replacing Video Image

Then, replacement of the video image displayed on the TV monitor 26 will be described by referring principally to FIGS. 2 through 5.

The operation for replacing the video image displayed on the TV monitor 26 is carried out by using the fader 1 and the fader 2 on the console wherein when the knob 206 of the fader 1 is clicked to shift the same in the direction of the upper (the bus A) or the lower (the bus B) side, a ratio in composition of the video signal in the bus A and the video signal in the bus B in the first compositing circuit 54 is changed. Furthermore, when the knob 208 of the fader 2 is clicked to shift the same in the direction of the upper (the bus A+the bus B) or the lower (the bus C) side, a ratio in composition of the video signal obtained by compositing the video signal in the bus A with the video signal in the bus B and the video signal in the bus C in the second compositing circuit 56 is changed.

More specifically, in the case where the knob 206 of the fader 1 is in the uppermost position (bus A side), only the video signal in the bus A is outputted from the first compositing circuit 54, while a ratio of outputting the video signal in the bus B outputted from the first compositing circuit 54 increases with the shifting of the knob 206 of the fader 1 directing to the lower position, and finally when the knob 206 of the fader 1 reached the lowermost position (the bus B side), only the video signal in the bus B is outputted from the first compositing circuit 54.

As is the same as that described above, in the case where the knob 208 of the fader 2 is in the uppermost position (the bus A+the bus B sides), only the video signal outputted from the first compositing circuit 54 is outputted from the second compositing circuit 56, while a ratio of outputting the video signal in the bus C outputted from the second compositing circuit 56 increases with the shifting of the knob 208 of the fader 2 directing to the lower position, and finally when the knob 208 of the fader 2 reached the lowermost position (the bus C side), only the video signal in the bus C is outputted from the second compositing circuit 56.

As a manner for replacing video images, there are manners of so-called wiping and mixing wherein a selection between wiping and mixing manners is performed by clicking a first mixing button 266 or a first, wiping button 268 with respect to the fader 1, while the selection is performed by clicking a second mixing button 270 or a second wiping button 272 with respect to the fader 2.

The term "mixing" used herein means a function for replacing two video images on the screen of the TV monitor 26 while overlapping these images, and on the other hand, the term "wiping" means a function for replacing two video images on the screen of the TV monitor 26 while switching these images.

Furthermore, when a first auto-fade button 274 is clicked, an automatically fading function for shifting automatically the knob 206 of the fader 1 at a prescribed constant speed can be selected, while when a second auto-fade button 276 is clicked, an automatically fading function for shifting automatically the knob 208 of the fader 2 at a prescribed constant speed can be selected.

It is to be noted that in case of replacing video images in two lines of buses, either the fader 1 or the fader 2 is merely used. Accordingly, in this case, it is necessary for previously setting either the fader 1 or the fader 2 so as not to contain the video image in the bus being in not use. More specifically, in case of employing only the fader 1, the knob 208 of the fader 2 is positioned at the uppermost position (the bus A+the bus B sides), while in case of employing only the fader 2, the knob 206 of the fader 1 is positioned at either the uppermost position (the bus A side: in case of using the video signal in the bus A) or the lowermost position (the bus B side: in case of using the video signal in the bus B).

For instance, in case of replacing the video image derived from the video signal in the bus A by the video image derived from the video signal in the bus B, first, the input selector for bus A 200 is operated to select the video signal to be supplied to the bus A, and then, the input selector for bus B 202 is operated to select the video signal to be supplied to the bus B.

Thereafter, the fader 1 is positioned at the uppermost position (the bus A side) while the fader 2 has been positioned at the uppermost position (the bus A+the bus B sides) since the fader 2 is not employed.

Moreover, it is decided that replacement of video images is performed in accordance with either a mixing manner or a wiping manner, and then, selection of either the mixing manner or the wiping manner is carried oust by clicking either the first mixing button 266 or the fist wiping button 268 of the first fader 1 dependent upon the aforesaid decision.

After the setting as described above has been made, when the knob 206 of the fader 1 is clicked to shift the same towards the lower position, the video image displayed on the TV monitor 26 is replaced from the video image in the bus A to that of the bus B.

In the following, the above described replacement will be more fully described in separate explanations for the mixing manner and the wiping manner.

3-3-1. Explanation for Processing of Mixing Manner

When the first mixing button 266 of the fader 1 is clicked, an internal switch SW7 is switched to the side b to control a ratio in composition of the respective video signals in the bus A and the bus B. The control in this case is realized by detecting a position of the knob 206 of the fader 1.

Furthermore, when the second mixing button 270 of the fader 2 is clicked, an internal switch SW8 is switched to the side b, whereby a ratio in compositing the video signal outputted from the first compositing circuit 54 with the video signal in the bus C by means of the personal computer 10 is controlled. The control in this case is realized by detecting a position of the knob 208 of the fader 2.

In these circumstances, when it is arranged in such that the video image in either bus of two lines of buses in which mixing processing is performed with respect to the video images contained therein is made to be white back (or black back), and when this video image is gradually replaced by the video image in the other bus which is the image except for white back, black back and color backs, the video image in the other bus comes to appear in the video image which has been displayed previously on the screen, i.e. so-called fade-in processing can be attained.

On the contrary to the above described fade-in processing, when the video image in the other bus is replaced gradually by the white back (or black back) of the video image in the former bus,.the video image in the other bus which has been previously displayed on the screen comes to disappear, i.e. so-called fade-out processing can be realized.

Moreover, when both of video images from which white back, black back and color backs have been excluded are employed as the video images of two lines to be used for mixing processing, so-called dissolves (replacing video images by one another) can be achieved.

3-3-2. Explanation for Processing of Wipe

When the first wiping button 268 of the fader 1 is clicked, the internal switch SW7 is switched to the side a, whereby a ratio in composition of the video signal in the bus A and the video signal in the bus B is controlled by a wipe pattern signal produced by a wipe pattern generating circuit 92.

Furthermore, when the second wiping button 272 of the fader 2 is clicked, the internal switch SW8 is switched to the side a, whereby a ratio in composition of the video signal outputted from the first compositing circuit 54 and the video signal in the bus C is controlled by a wipe pattern signal produced by a wipe pattern generating circuit 92.

The term "wipe pattern generating circuit 92" used herein means a circuit for generating a signal having each of thirteen kinds of wipe patterns which have previously been set, and these thirteen kinds of wipe patterns can be selected by clicking the button of a wiping selector 278.

More specifically, when any of the buttons in the wiping selector 278 is clicked, the button of the wiping selector 278 which was clicked is detected on the side of the personal computer 10, and then, the wipe pattern generating circuit 92 is instructed so as to generate the wipe pattern corresponding to the detected button.

Furthermore, the reading timing of the wipe pattern generating circuit 92 is such that in the case when the video 1 signal is inputted to the video 1 signal input terminal 30, one line of branched three lines of the video 1 signal is inputted to the internal switch SW4 (which has been switched to the side a) through the synchronously processing circuit 86 after the inputting the video 1 signal to the video 1 signal input terminal 30.

Then, the video 1 signal inputted to the internal switch SW4 (which has been switched to the side a) through the synchronously processing circuit 86 is inputted to a reading clock generating circuit 90 wherein the reading clock of a wipe pattern is generated on the basis of the video 1 signal, the reading clock of the wipe pattern generated by the reading clock generating circuit 90 is inputted to the wipe pattern generating circuit 92, and as a result, the wipe pattern is read on the basis of the reading clock of the wipe pattern generated by the reading clock generating circuit 90.

Moreover, in the case when the video 1 signal is not inputted to the video 1 signal input terminal 30, the internal switch SW4 is switched to the side b, as a consequence, a synchronous timing of the stable video signal generated by an internal synchronization generating circuit 88 is inputted to the reading clock generating circuit 90, and a wipe pattern is read on the basis of the reading clock of the wipe pattern generated herein.

It is to be noted that the wipe patterns corresponding to the respective buttons of the wipe selector 278 correspond to designs shown on the respective buttons. In the case where it is desired to set a wiping direction being reverse to that shown on each of the buttons of the wipe selector 278, it is sufficient to click a reverse button 280, and in case of returning to the original state, the reverse button 280 may be clicked once again.

A wiping direction in case of shifting both the knob 206 of the fader 1 and the knob 208 of the fader 2 from the upper position to the lower position is reverse to the case where both the knobs 206 and 208 of the faders 1 and 2 are shifted from the lower position to the upper position. However, if wiping of video images in the same direction is intended, it is sufficient to click a one-way button 282 irrespective of shifting directions of both the knobs 206 and 208 of the faders 1 and 2, and in case of returning to the original state, the one-way button 282 may be clicked once again.

In the present mode for embodying the invention, it is arranged in such that either one of the fader 1 and the fader 2 can only be selected in case of wiping operation, besides wiping operation cannot be selected in the fader 1 in the case where the key button 284 is clicked for effecting chromakey processing or the like in the fader 2.

However, unlike the present mode for embodying the invention, it may be arranged in such that wiping operation can be selected in both the fader 1 and the fader 2, and further that wiping operation can be selected in the fader 1 in even the case where the key button 284 is clicked in the fader 2.

3-3-3. Explanation for Processing of Automatic Fading

In the case where automatic shifting of the knob 206 of the fader 1 and the knob 208 of the fader 2 is intended at a constant speed, it is sufficient to carry out the processing of automatic fading. Such automatic fading processing can be performed in the fader 1 and the fader 2, respectively.

The operation for performing the automatic fading processing is such that first, the knob of either the fader 1 or the fader 2 in which the processing of automatic fading is intended is positioned to the uppermost position (the bus A side in case of the fader 1, and the bus A+the bus B sides in case of the fader 2) or the lowest position (the bus B side in case of the fader 1, and the bus C side in case of the fader 2).

Then, an auto-fade button (the first auto-fade button 274 in case of the fader 1, and the second auto-fade button 276 in case of the fader 2) of either the fader 1 or the fader 2 in which automatic fading processing is intended to perform is clicked.

Each speed for shifting automatically the knob 206 of the fader 1 and the knob 208 of the fader 2 can suitably be varied by the following operations.

Namely, first, when the setting button 240 in the menu on the console is clicked to open the setting menu, and a "video fader" command is selected. As a consequence, a "video fader setting" dialog box is displayed (see FIG. 8). Each of speeds for shifting the knob 206 of the fader 1 and the knob 208 of the fader 2 is specified by each of numerical values, and then the OK button 286 is clicked to close the dialog box.

Figure 8:
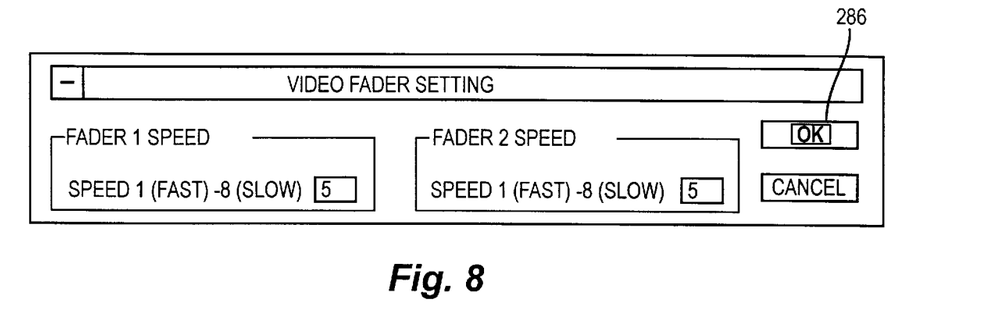
FIG. 8 is an explanatory view showing the "video fader setting" dialog box displayed on a display device.

According to the above described operations, the speeds for shifting automatically the knob 206 and the fader 1 and the knob 208 of the fader 2 can arbitrarily be set.

In such a case when the first auto-fade button 274 or the second auto-fade button 276 is clicked in the event where either the knob 206 of the fader 1 or the knob 208 of the fader 2 is on the midway, either of the knob 206 of the fader 1 and the knob 208 of the fader 2 shifts once to either the uppermost or the lowermost position being the one positioned nearer to either of the knobs 206 and 208, and then automatic fading processing is carried out.

Furthermore, in the present mode for embodying the invention, while a scrolling function for scrolling frames cannot be performed simultaneously with automatic fading processing, it may be, of course, adapted to be capable of effecting automatic fading processing together with the scrolling function.

In the present mode for embodying the invention, while the explanation has been made on automatic fading processing in either the case where the respective faders shift from the lowermost position to the uppermost position or the case where the respective faders shift from the uppermost position to the lowermost position, it may be also arranged in such that shifting of the respective faders start from a position on the midway or stop at a position on the midway.

In FIG. 4, a triangular mark 340 in the fader 1 is adapted to be movable through dragging of the mouse 14, whereby a stopping position for movement of the fader 1 is set. When the triangular mark 340 is dragged by the use of the mouse 14 to move the mark 340 to an arbitrary position, and then to stop the same, the position at which the triangular mark 340 stopped is the stopping position for movement of the fader 1.

Thereafter, the knob 206 of the fader 1 is dragged to move to a prescribed position, and then, when the first auto-fade button 274 is clicked, the knob 206 shifts automatically from the present position to the position specified by the triangular mark 340.

In accordance with the same manner as that described above, a starting position for movement as well as a stopping position for movement in case of automatic fading processing can also be set with respect to the fader 2 as well as the undermentioned audio faders (an audio fader A1, an audio fader A2, and an audio fader AUX), respectively, In this case, if the audio faders have been set to move in synchronization with the movement of the fader 1, they are constituted in such that when the fader 1 commences the movement from the starting position for movement, the audio faders commence also simultaneously the movement from the starting position for movement with the former movement, while when the fader 1 reaches the stopping position for movement, the audio faders also reach the stopping position for movement at the same time of the reach of the fader 1.

A moving rate of the fader 1 has previously been set suitably, and a moving rate of an audio fader is calculated from a distance moved of the audio fader and a required period of time calculated from a distance moved and the moving rate of the fader 1.

In the case where the moving rates of the audio faders have been set, it may be arranged in such that the video faders and the audio faders move at their rates, respectively, and these faders move respectively before they reach the stopping positions for movement.

4. Edition of Audio Data 4-1. Audio Fader

Controlling of levels or ratios in addition of the audio 1 signal, the audio 2 signal, and the AUX signal to be inputted can be performed independent of or in synchronization with video composition.

Referring to FIGS. 2 through 4, an explanation will be made hereinbelow in respect of edits of the audio signals inputted to the audio 1 signal input terminal 40, the audio 2 signal input terminal 42, and the AUX signal input terminal 44, respectively.

First, edits of the audio signals inputted to audio 1 signal input terminal 40, the audio 2 signal input terminal 42, and the AUX signal input terminal 44 can be carried out by shifting the knobs of the audio faders on the console.

More specifically, when the respective knobs 320, 322, 324, and 326 of the audio fader A1, the audio fader A2, the audio fader AUX, and a master audio fader are shifted in the vertical direction, voltages of VCA 96, 98, 100, and 104 corresponding to these audio fader A1, audio fader A2, audio fader AUX, and master audio fader vary, respectively, whereby volumes of the audio 1 signal, the audio 2 signal, and the AUX signal can be changed, respectively, besides the whole volumes obtained by adding all the audio 1 signal, the audio 2 signal, and the AUX signal can also be changed.

Meanwhile, it is possible to independently vary only the volumes or also to vary synchronously the volumes with video images in such variation in volumes.

In the case where it is intended to vary only the volumes, it is sufficient to click each of the knobs 320, 322, 324, and 326 of the audio fader A1, the audio fader A2, the audio fader AUX, and the master audio fader to shift each of these knobs in the vertical directions.

On one hand, in the case where it is intended to vary audio signals in synchronization with changes in video images such as switching, composition and the like of video images, it is sufficient to set the above described audio fader A1, the audio fader A2, the audio fader AUX, and the master audio fader in synchronization with movements of the fader 1 and the fader 2.

Once, it has been set in such that the audio fader A1, the audio fader A2, the audio fader AUX, or the master audio fader moves synchronously with the movement of the fader 1 or the fader 2, so that a video image can be switched together with the audio signal therefor by merely operating the fader 1 or the fader 2.

In case of synchronizing audio signals with video images, when the video faders (the fader 1 and the fader 2) are shifted, the audio signals can be synchronously varied with the video images, while even when the audio faders (the audio fader A1, the audio fader A2, the audio fader AUX, and the master audio fader) are shifted, it is adapted not to synchronously vary audio signals with video images, but to vary only the audio signals corresponding to the audio fader which was shifted, and no video image changes.

Figure 9:
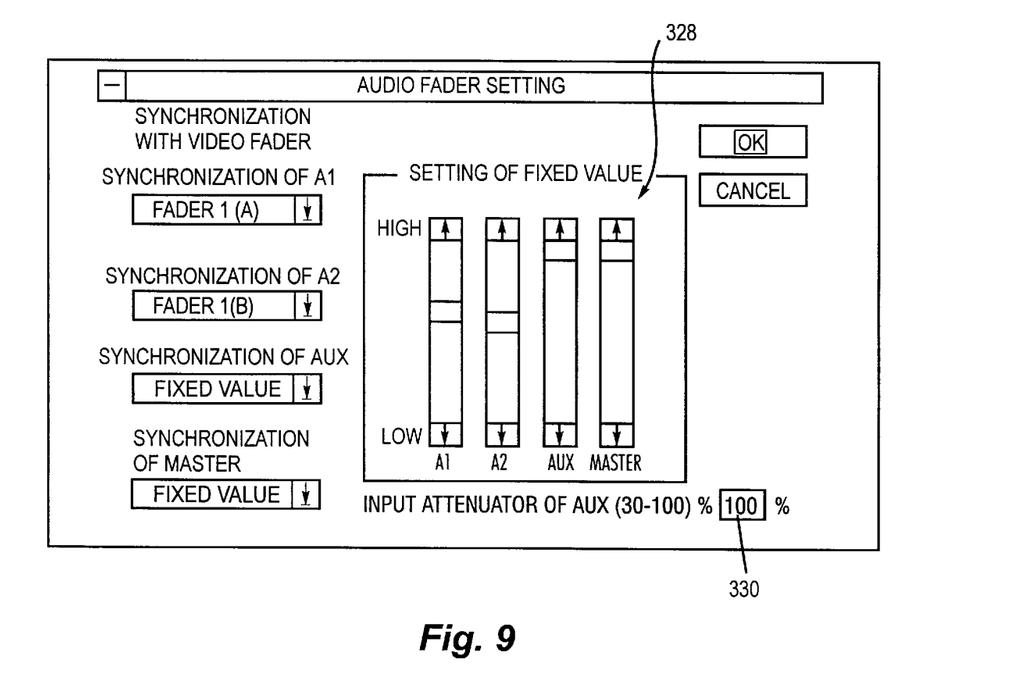
FIG. 9 is an explanatory view showing the "audio fader setting" dialog box displayed on a display device.

4-2. Explanation for Setting Operations in Synchronization of Audio Data with Video Images An explanation will be made hereinbelow on the setting operations in the case where an audio signal is changed synchronously with the above described changes in video images. First, a setting button 240 in the menu on the console is clicked to open the setting menu, and then an "audio fader" command is selected. As a result, an "audio fader setting" dialog box is displayed (see FIG. 9). As shown in FIG. 9, synchronous/asynchronous settings of the respective video faders (the fader 1 and the fader 2) and the respective audio faders are displayed on the left side in the "audio fader setting" dialog box.

There are the following cases with respect to the respective audio faders as the setting manners in case of synchronous/asynchronous setting.

(1) Fixed value: A video fader does not synchronizes with an audio fader (asynchronism). In the case where a video fader is not synchronized with an audio fader, a fixed value is set. In case of setting a fixed value, fixed values can arbitrarily be set by operating a "fixing value setting" column 328. In the "fixing value setting" column 328, the position of a knob for an audio fader on the console is set in the case where the "audio fader setting" dialog box is closed. When the position was once set, the fixed value can freely be changed by operating the knob of the audio fader on the console in which a value of "0–255" may be selected as a fixed value.

(2) Fader 1(A): A video fader synchronizes with an audio fader. When the fader 1 is shifted to the side A, the audio fader varies also so as to increase the volumes. In this case, a value (Data (VCA1)) of the fader 1 is used as a value for the audio fader.

(3) Fader 1(B): A video fader synchronizes with an audio fader. When the fader 1 is shifted to the side B, the audio fader varies also so as to increase the volumes. In this case, a value "255-Data (VCA1)" is used as a value for the audio fader.

(4) Fader 2(AB): A video fader synchronizes with an audio fader. When the fader 2 is shifted to the sides AB, the audio fader varies also so as to increase the volumes. In this case, a value (Data (VCA2)) of the fader 2 is used as a value for the audio fader.

(5) Fader 2(C): A video fader synchronizes with an audio fader. When the fader 2 is shifted to the side C, the audio fader varies also so as to increase the volumes. In this case, a value "255-Data (VCA2)" is used as a value for the audio fader.

Dependent upon an equipment connected to the AUX signal input terminal 44, there is a case where volumes become excessively loud, when an audio fader operates at the maximum. In such case, the volumes may be adjusted in an "AUX input attenuator" column 330.

4-3. Explanation for Internal Processing

In the following, a detailed explanation will be made for the processing in the case where synchronous/asynchronous settings of the respective video faders and the respective audio faders were made in accordance with operations of an audio fader as described above.

Figure 10:
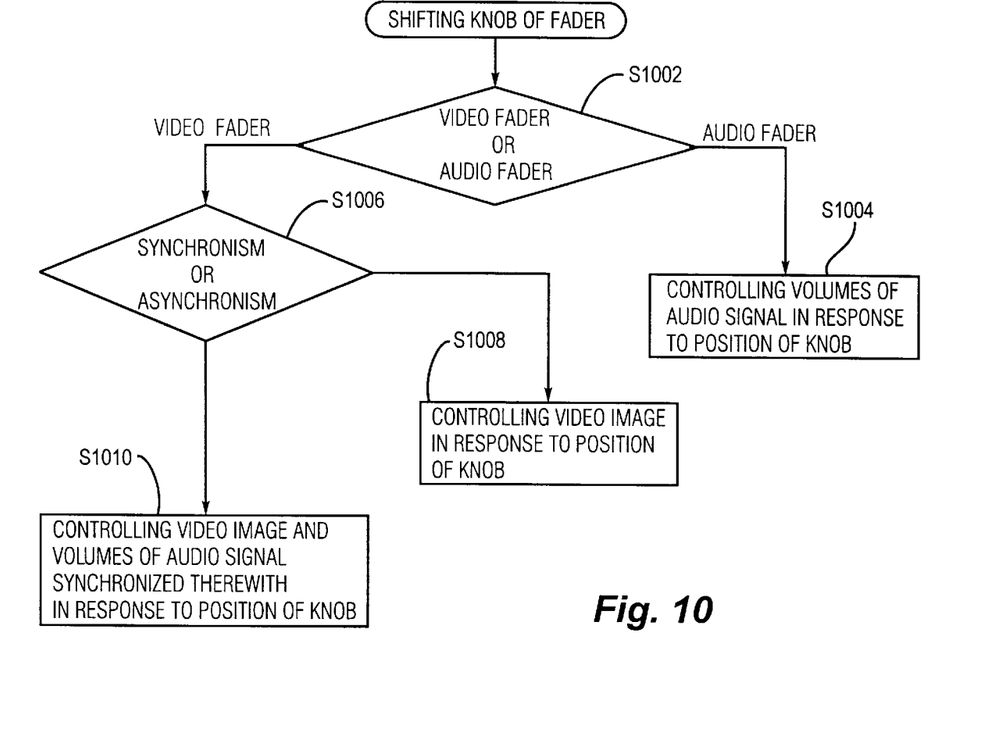
FIG. 10 is a flowchart showing the processing in the case where shifting operations are performed by clicking the knob of a video fader or an audio fader.

In FIG. 10, the processing in the case where a shifting operation was made by clicking either a knob of a video fader or a knob of an audio fader is illustrated wherein it is judged that either the knob of a video fader is clicked to shift the same, or the knob of an audio fader is clicked to shift the same (step S1002), and in the case where the knob of the audio fader is clicked to shift the same, volumes of audio signals are controlled in response to the position at the knob of the audio fader which was shifted by clicking the same (step S1004).

On the other hand, in the case where the knob of the video fader is clicked to shift the same in the step S1002, control is effected in response to a synchronous/asynchronous setting state between the video fader which was shifted by clicking the knob thereof and each of the audio faders (step S1006), i.e. in case of asynchronous setting, the video image is controlled in response to the position at the knob of the video fader which was shifted by clicking the same (step S1008).

While in case of the synchronous setting in the step S1006, video images are controlled in response to the position at the knob of the video fader which was shifted by clicking the same, besides the knob of the audio fader being in synchronization with the video fader which was shifted by clicking the knob is synchronously shifted with the shifting of the knob of the aforesaid video fader to control audio signals in response to the position at the knob thereof (step S1010).

Figure 11:
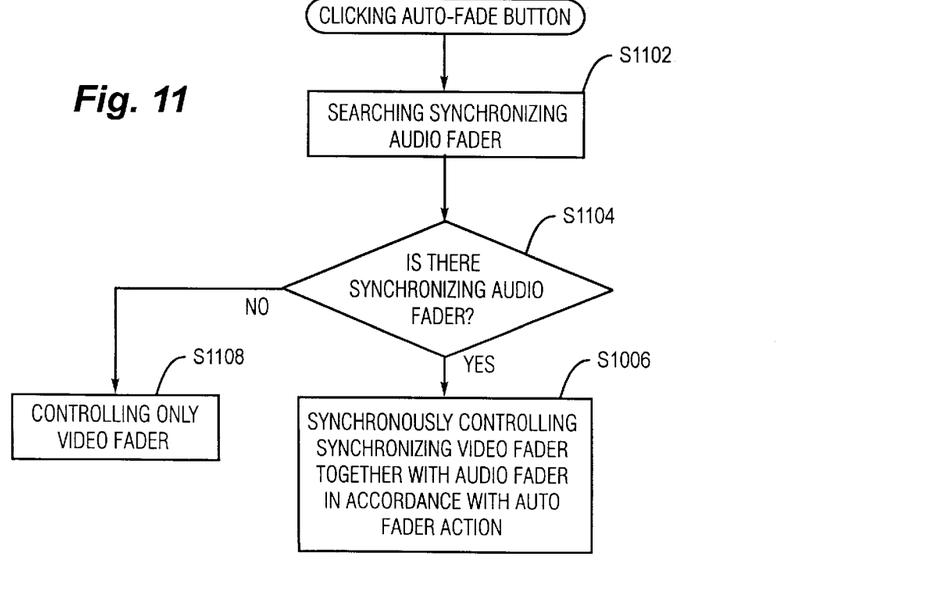
FIG. 11 is a flowchart showing the processing in the case where a video fader is controlled in accordance with an auto fading action.

Meanwhile, in the case where either the fader 1 is controlled by means of the first auto fade button 274, or the fader 2 is controlled by means of the second auto fade button 276, first, an audio fader synchronizing with a video fader which is controlled by an auto fading action is searched as shown in FIG. 11 (step S1102).

Then, if there is a fader which synchronizes with the video fader controlled by the auto fading action (step S1104), the video fader and the audio fader are synchronously controlled by the auto fading action (step S1106).

On the other hand, if there is no fader synchronizing with the video fader which is controlled by the auto fading action (step S1104 only the video fader is controlled (step S1108).

Since the present invention has been constituted as described above, there is an excellent advantage to improve the operability in case of editing audio signals and video signals in a video editor used suitably for a DTV and the like.

It will be appreciated by those of ordinary skill in the art that the present invention can be embodied in other specific forms without departing from the spirit or essential characteristics thereof.

The presently disclosed manners for embodying the invention are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A video editor wherein at least two each of audio and video signals are inputted, and levels of the audio and the video signals inputted are controlled in response to the operations of faders, comprising:

a first fader which a user can operate for indicating a ratio of composition in said at least two video signals inputted, a second fader which a user can operate for indicating the levels of said at least two audio signals inputted, a synchronous/asynchronous mechanism for establishing whether the levels of said at least two audio signals inputted are synchronous or asynchronous with operations of said first fader, a first level controller for controlling a ratio of composition in said at least two video signals inputted in response to the operations of said first fader, and a second level controller for controlling the levels of said at least two audio signals inputted in response to operations of said first fader when said mechanism is establishing levels synchronous with the operations of said first fader, said second level controller controlling the levels of said at least two audio signals inputted in response to said second fader when said mechanism is establishing levels asynchronous with the operations of said first fader.

2. A video editor as claimed in claim 1 further comprising a fader controller which shifts an operating position of said second fader in response to the operations of said first fader when said mechanism is establishing levels synchronous with the operations of said first fader.

3. A video editor as claimed in claim 1 wherein said at least two audio signals inputted comprise first and second audio signals, said second fader is provided to each of said first and second audio signals, and said mechanism establishes a level of said first audio signal to be either synchronous or asynchronous with the operations of said first fader independently of said second audio signal, and said mechanism establishes a level of said second audio signal to be either synchronous or asynchronous with the operations of said first fader independently of said first audio signal.

4. A video editor as claimed in claim 1 further comprising an adjuster which sets a level control for each of said at least two audio signals inputted in response to the operations of said first fader, said second level controller further controlling the level for said at least two audio signals inputted in response to the setting of said adjuster.

5. A video editor as claimed in claim 1 wherein said first fader and said second fader are displayed on a screen of a computer, said first and second faders being operable in response to a pointing device.

* * * * *